United States Patent [19]

Vollmer et al.

[11] Patent Number: 4,588,323

[45] Date of Patent: May 13, 1986

[54] COUPLING DEVICE

[75] Inventors: Jürgen Vollmer, Lohmar; Paul Herchenbach, Ruppichteroth, both of Fed. Rep. of Germany

[73] Assignee: Jean Walterscheid GmbH, Lohmar, Fed. Rep. of Germany

[21] Appl. No.: 572,576

[22] Filed: Jan. 20, 1984

[30] Foreign Application Priority Data

Jan. 25, 1983 [DE] Fed. Rep. of Germany ....... 3302379

[51] Int. Cl.⁴ .............................................. F16D 3/32
[52] U.S. Cl. .................................... 403/12; 403/322; 403/359
[58] Field of Search ................. 403/325, 322, 359, 13, 403/14, 12, 11, 327, 328

[56] References Cited

U.S. PATENT DOCUMENTS 4,157,019  6/1979  von Allworden ............. 464/182 X
4,169,686 10/1979  Balensieten et al. .................. 403/12

Primary Examiner—Andrew V. Kundrat
Attorney, Agent, or Firm—Toren, McGeady, Stanger, Goldberg & Kiel

[57] ABSTRACT

A coupling device for connecting a drive shaft in a farm implement wherein a support arm is pivotally mounted at both ends thereof with the drive shaft in order to support the drive shaft in a manner which facilitates coupling thereof with a drive source. The support arm is telescopically extendable and includes a first spring connected to apply a spring force relative to pivotal motion of the support arm and a second spring applying a spring force acting longitudinally of the telescoping support arm. One end of the support arm is mounted at a point of articulation associated with the driven end of the drive shaft and the other end of the support arm is mounted at another point of articulation which is connected through a bearing with the free end of the drive shaft at which a connection is made with a drive source.

7 Claims, 6 Drawing Figures

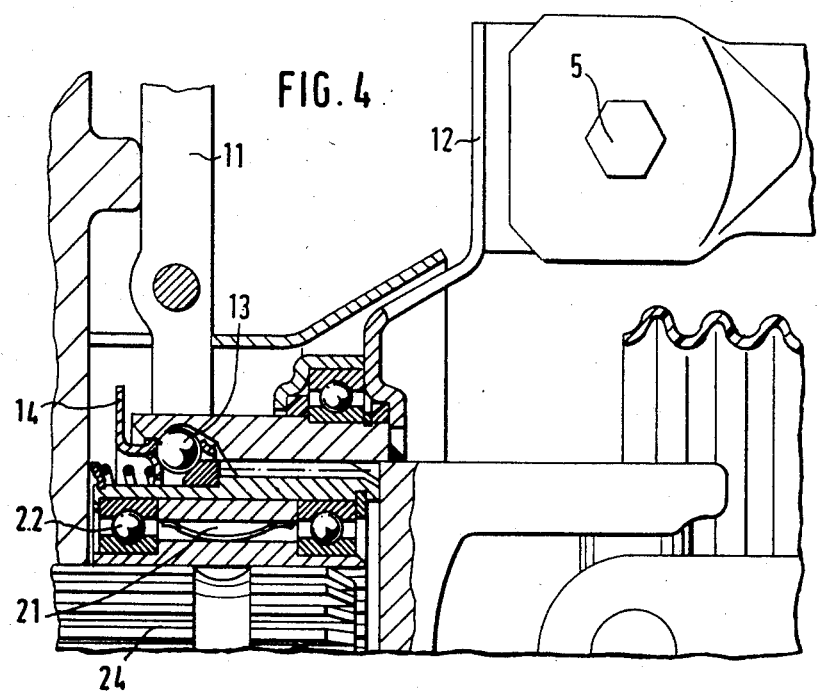
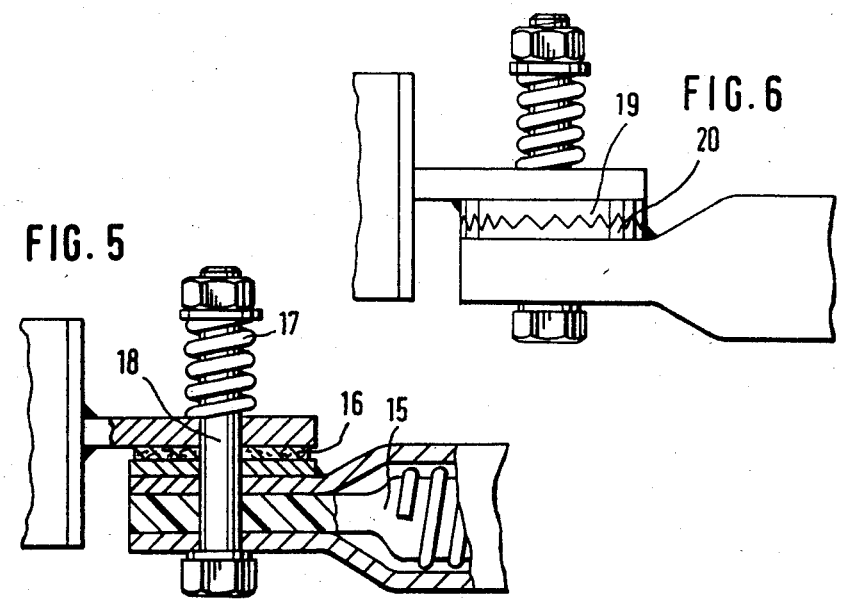

COUPLING DEVICE

The invention relates to a coupling device for connecting a drive shaft which forms a drive line for driving an agricultural implement or trailer through a tractor. More specifically, the invention relates to a coupling device consisting of a spring suspended drive shaft support wherein two coupling elements, axially lockable relative to each other and having a freewheeling device associated therewith, are adapted to be connected with each other to positively engage the drive shaft.

A drive shaft coupler wherein both the drive shaft and the associated coupling device are attached to a fixed point in a spring suspended manner is known in the art in DE-OS No. 24 14 715. To permit coupling, the rear of the tractor is provided with a hinged guiding part by means of which the drive shaft end to be coupled is guided towards the power take-off shaft.

Since both the drive shaft and the part to be coupled and associated with the drive shaft are suspended on separate tension springs, defined alignment of the drive shaft for the purpose of coupling is not possible.

A further disadvantage arises in that the guiding part is arranged in an area which is normally reserved for connecting devices, such as connecting rails or a tension pendulum.

Therefore, the present invention is intended to provide a coupling device which, after a single alignment operation relative to the respective tractor or implement, permits automatic recoupling of the drive shaft after, for example, a change of implement.

SUMMARY OF THE INVENTION

Briefly, the present invention may be described as a coupling device for connecting the drive shaft of an agricultural implement to a tractor comprising a supporting arm vertically pivotable around a first articulation point associated with the driven end of the drive shaft and designed as a fixed point connected to the free drive shaft end designed as a coupling sleeve, by means of a second articulation point and by means of a bearing.

The two articulation points are each formed by a hinge which is tensioned in a friction locking manner by a spring and pivotable in the vertical direction.

A pressure spring is arranged within the supporting arm formed of two profile tubes inserted into each other.

The advantage of the coupling device in accordance with the invention is that after initial alignment of the free end of the drive shaft with respect to the tractor, the drive shaft, after disengagement, is held in a position which permits automatic recoupling simply by reversing the tractor. There is no need for the tractor driver to leave his seat or to ask for assistance.

A further advantage is that, essentially, production drive shafts may be used, which merely require an outer joint yoke designed especially for the coupling operation.

According to a further essential feature of the invention, the second articulation point is arranged to be additionally swivable in the horizontal plane.

This design is particularly advantageous if the drive shaft connection at the implement end is arranged away from the center, i.e., in cases where long connecting devices are used.

According to a further embodiment of the invention, the two ends of the pressure spring each are provided with an end piece screwed into a thread corresponding to the spring winding and passing through the hinges.

As a result of this arrangement, the pressure spring for the supporting arm simultaneously limits the extension range, i.e., it prevents the supporting arm and thus the drive shaft from being pulled apart completely.

According to a further feature of the invention, the locking effect of the coupling elements designed as a coupling hub and a coupling sleeve can be offset by the action of the swivel lever in the direction opposite to the disengaging direction.

As the swivel lever does not act on the coupled parts in the disengaging direction, it is ensured that unintentional actuating of the swivel lever when the tractor and implement are in operation does not result in the drive shaft being disconnected.

In a further embodiment of the invention, a hydraulic motor is arranged in the supporting arm. This hydraulic motor is designed as a hydraulic cylinder cooperating with a piston and permits controlled manipulation of the drive shaft length.

In a further advantageous embodiment of the invention, the supporting arm is supported towards the coupled end of the drive shaft by a hydraulic cylinder. This design permits height adjustment of the drive shaft, which also considerably facilitates initial coupling of the drive shaft to the power take-off shaft.

According to a further essential feature of the invention, the articulation points have been provided with two spring-loaded toothed discs. This measure ensures positive tensioning of the articulation points, which is particularly advantageous in the case of heavy drive shafts.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DESCRIPTION OF THE DRAWINGS

In the drawings

FIG. 4 is a sectional view showing the coupling parts in greater detail;

FIG. 5 is a sectional view taken through an articulation point; and

FIG. 6 is a sectional view through an articulation point having a toothed disc support.

DETAILED DESCRIPTION OF THE PREFERRED EMBODIMENTS

Figure 1:
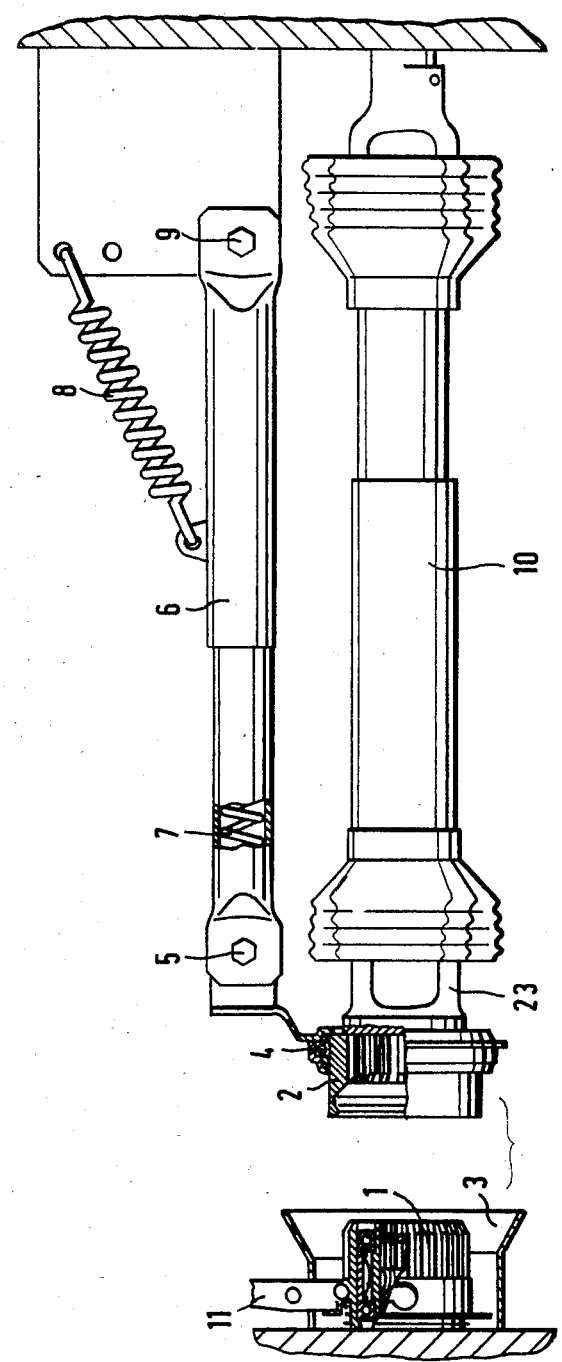
FIG. 1 is a side view showing a coupling device before a coupling operation.

The coupling device illustrated in the drawings essentially consists of a coupling hub 1 which can be attached to a power take-off shaft, into which a freewheeling unit has been incorporated and with which two bearings 22 are associated. A drive shaft 10 to be coupled is provided with an outer joint yoke 23 which ends in a coupling sleeve 2 corresponding to the coupling hub 1.

Above the drive shaft 10 there is provided a first articulation point 9 pivotally mounting a supporting arm 6 which is held by the force of a spring 8 and which is composed of two telescoping parts loaded outwardly by the force of a pressure spring 7. The coupling sleeve 2 corresponding to the coupling hub 1 is held from above through a bearing 4 by a holding device 12 connected to the supporting arm by means of an articulation point 5.

For initially coupling an implement to an agricultural tractor, the supporting arm 6 and the drive shaft 10 must be aligned manually so as to be in the coupling position.

For uncoupling the shaft, the locking mechanism between the coupling hub 1 and the coupling sleeve 2 is disengaged by operating the swivel lever 11 and the tractor is moved away from the implement. In the process, the supporting arm 6 and the drive shaft 10 will continue to extend until the maximum extended length of the supporting arm 6 has been achieved. Subsequently, the coupling sleeve 2 is pulled away from the coupling hub 1 and remains in this extended position as a result of the tensioned articulation points 5 and 9 of the supporting arm 6.

For renewed coupling, the tractor is moved towards the implement until the coupling sleeve 2 is again connected to the coupling hub 1. As an alignment aid, it is possible to use the coupling points of a three point attaching device which is easy to observe from the tractor seat.

Figure 2:
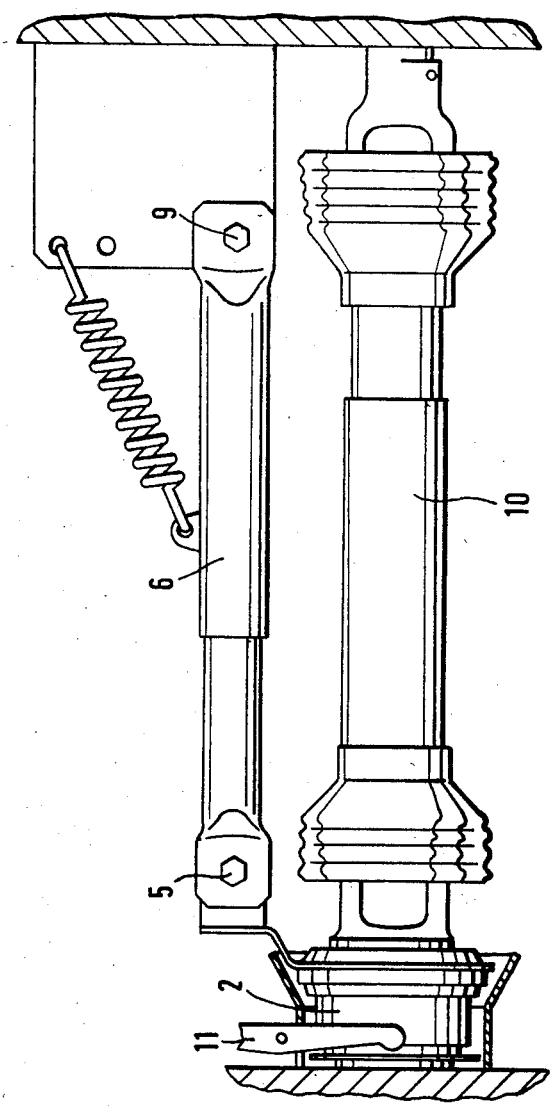
FIG. 2 is a side view illustrating the coupling device with a coupled drive shaft.

FIG. 2 shows the coupling device with the drive shaft 10 being connected.

Figure 3:
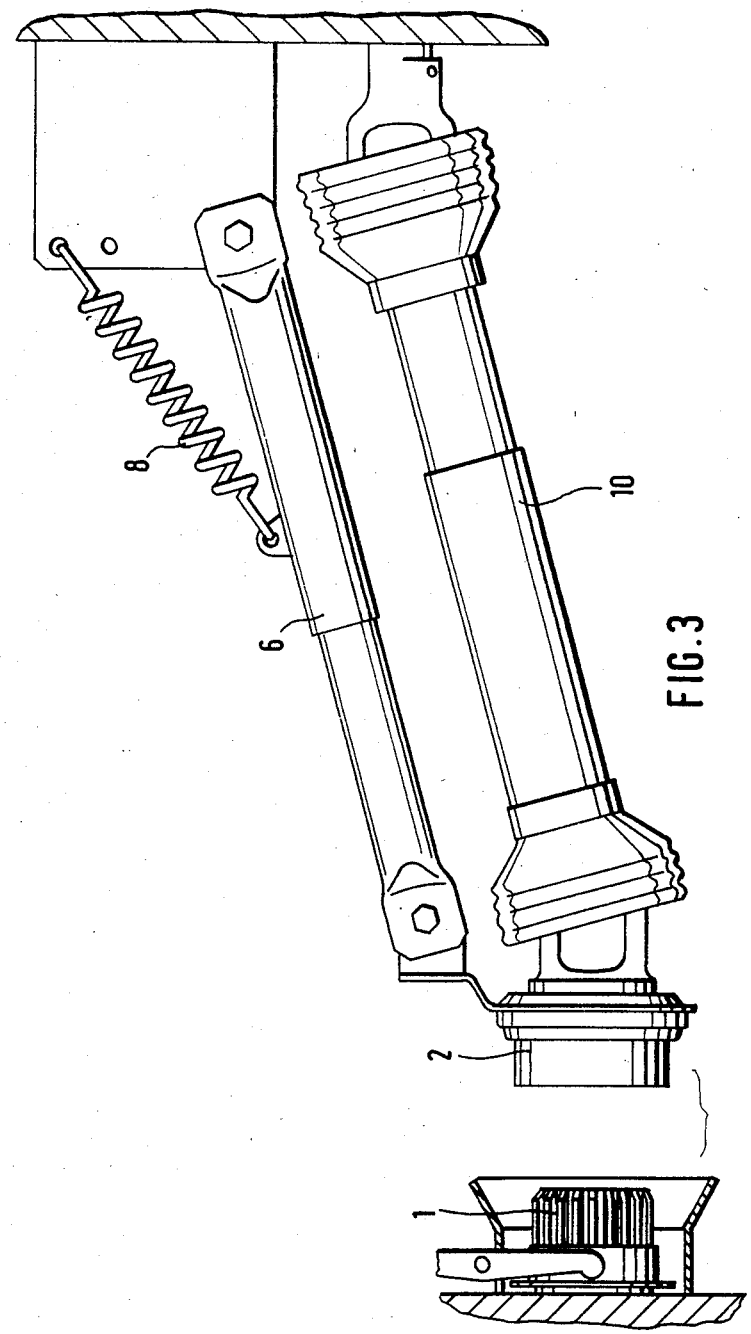
FIG. 3 is a side view showing the effect of the coupling device with an articulated drive shaft.

FIG. 3 shows a coupling device in the case of which the drive shaft 10 and the supporting arm 6 are articulated due to the different power take-off shaft heights at the tractor and at the agricultural implement.

FIG. 4 shows the cooperation between the coupling hub 1 and the coupling sleeve 2. The coupling hub 1 is attached to a power take-off shaft 24 and is locked by locking members 13 which are disengageable from their locked position by operation of the swivel lever 11 acting on a disengaging flange 14. The hub 1 is also provided with a freewheeling unit 21, with the two coupling hub parts being supported relative to each other by bearings 22. The bearing 4 connects the coupling sleeve 2 to the holding device 12 which is connected to the supporting arm 6 by the articulation point 5.

FIG. 5 is a sectional view showing how the articulation points 5 or 9 may be structured. The compressed ends of the supporting arm 6, together with the end piece 15 connected to the pressure spring 7, are rotatably connected relative to another member by a screw 18. Between the other member and the end of supporting arm 6, provision is made for a friction disc 16 which, in connection with the tension of the spring 17, causes a certain stiffness of the articulation points 5 or 9, with the stiffness being adjustable via the screw 18.

At the same time, if bending forces act against the force of the springs 17, the supporting arm 6 is capable of handling these bending forces up to a certain extent.

FIG. 6 shows an alternative construction for the articulation points 5 or 9 wherein, instead of the friction disc 16, provision is made for two corresponding toothed discs 19 and 20 which permit a step-wise adjustment of the articulation points (5 and 9).

The drive shaft 10 is preferably firmly installed at the implement to be attached and coupled to the tractor take-off shaft at the tractor end.

Especially when using a hydraulic motor within the supporting arm 6 or when articulating the supporting arm 6 by means of a hydraulic cylinder, it may be advantageous to install the drive shaft firmly at the tractor end and to align it relative to the power take-off shaft of the implement by utilizing tractor hydraulics.

Thus, it will be seen that the invention operates to provide a coupling device which, for the farmer, facilitates frequent coupling and uncoupling of the drive shaft.

The objective of the invention is achieved by providing, for example, the power take-off shaft of the tractor with a coupling part having an integrated freewheeling unit and by holding the drive shaft at the implement to be coupled by a supporting arm adjustable in the case of stiff bearing areas.

This ensures that after initial coupling, the drive shaft is held in the desired coupling position so that the drive shaft may be coupled without there being any need for manual operations.

What is claimed is:

1. A coupling device for connecting a drive shaft to a power take-off shaft particularly for attaching an agricultural implement in driving engagement with a tractor, comprising:
   a drive shaft having a free end and a driven end;
   a coupling member located at said free end adapted to couple said drive shaft with a complementary coupling member on a power take-off shaft;
   bearing means on said free end of said drive shaft;
   a support arm vertically pivotable at one end thereof about a first articulation point associated with said driven end of said drive shaft and having its opposite end pivotally connected about a second articulation point with said free end of said drive shaft through said bearing means;
   first spring means connected to provide a spring force applied relative to pivotal motion of said support arm about said first articulation point;
   said support arm being constructed as a telescoping member including second spring means applying a spring force acting longitudinally of said support arm.

2. A coupling device according to claim 1, wherein said second articulation point is provided with additional means enabling pivotal motion in the horizontal plane.

3. A coupling device according to claim 1, wherein said support arm includes hinges connecting said support arm at its opposite ends to said first and second articulation points and wherein said second spring means comprise a pressure spring having its opposite ends provided with an end piece in threaded engagement with a thread corresponding to the spring winding and passing through said hinges.

4. A coupling device according to claim 1, wherein the engagement of said coupling member with said complementary coupling member is adapted to be disengaged by a swivel lever acting in a direction opposite to the disengaging direction of said coupling members.

5. A coupling device according to claim 1, wherein said support arm includes a hydraulic motor.

6. A coupling device according to claim 1, wherein said supporting arm is supported toward the coupled end of said drive shaft by means of a hydraulic cylinder.

7. A coupling device according to claim 1, wherein said first and said second articulation points are provided with a pair of spring-loaded toothed discs.

* * * * *